Dec. 3, 1929.                T. E. CLARK ET AL                1,737,751
              LOCOMOTIVE CONTROL INSTALLATION
                    Filed May 2, 1927         6 Sheets-Sheet 1

INVENTORS
Thomas E. Clark & James E. Clark
BY
Edward N. Pagelsen
ATTORNEY

Dec. 3, 1929.  T. E. CLARK ET AL  1,737,751
LOCOMOTIVE CONTROL INSTALLATION
Filed May 2, 1927   6 Sheets-Sheet 2

Dec. 3, 1929.  T. E. CLARK ET AL  1,737,751
LOCOMOTIVE CONTROL INSTALLATION
Filed May 2, 1927  6 Sheets-Sheet 3

INVENTORS
Thomas E. Clark & James E. Clark
BY Edward N. Pagelsen.
ATTORNEY

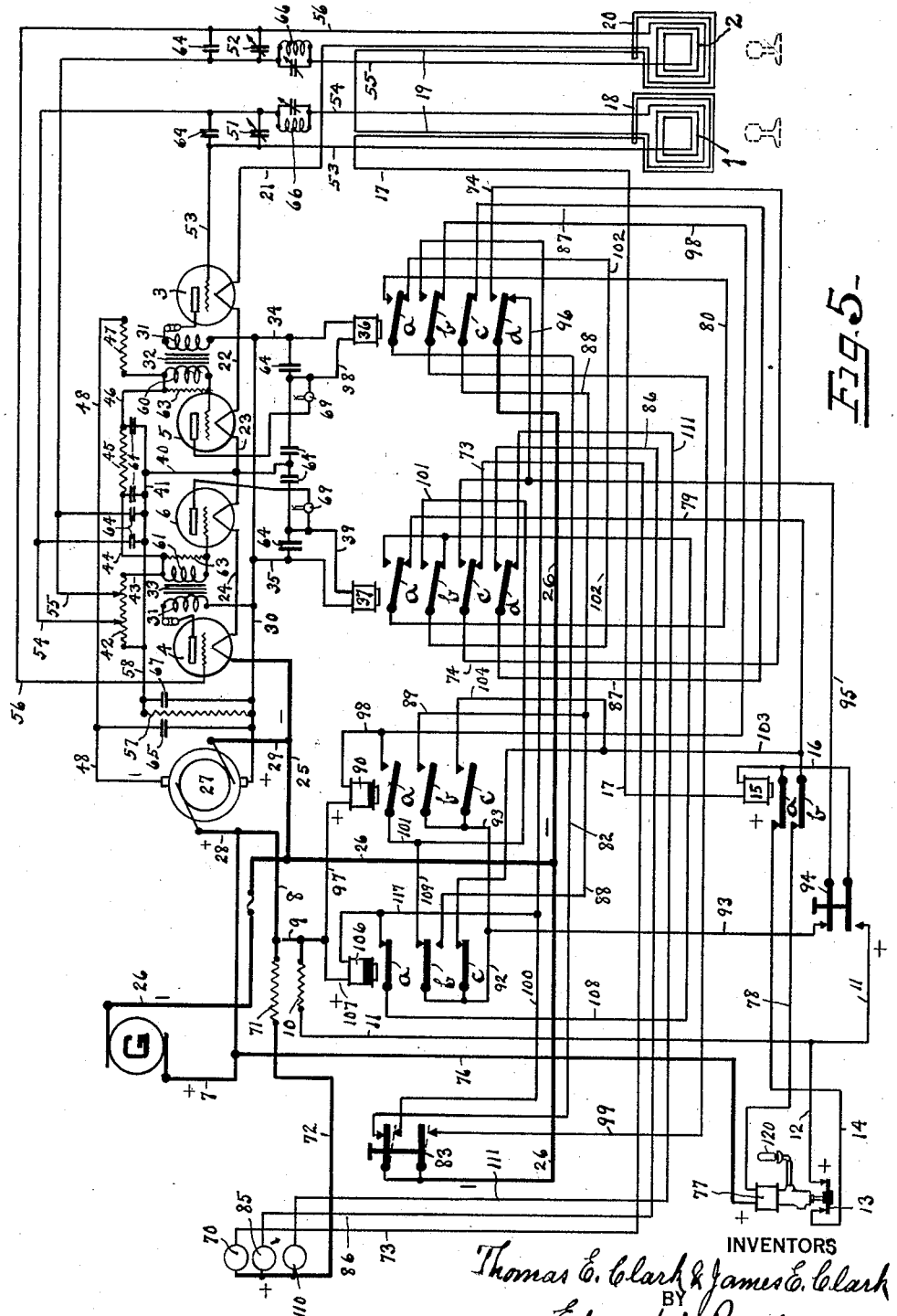

Dec. 3, 1929.   T. E. CLARK ET AL   1,737,751
LOCOMOTIVE CONTROL INSTALLATION
Filed May 2, 1927   6 Sheets-Sheet 6
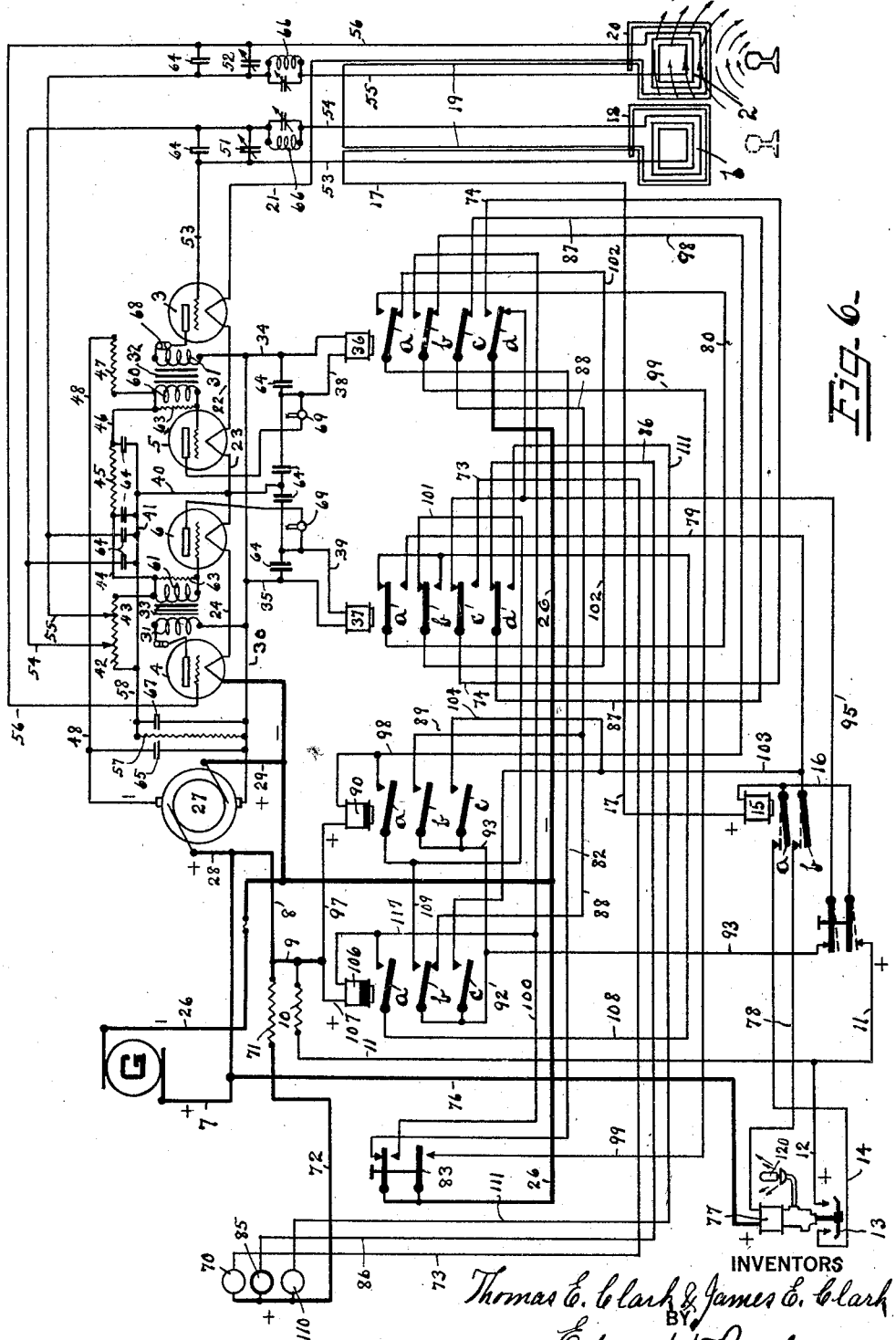
INVENTORS
Thomas E. Clark & James E. Clark
BY
Edward N. Pagelsen,
ATTORNEY Patented Dec. 3, 1929

1,737,751

UNITED STATES PATENT OFFICE

THOMAS E. CLARK AND JAMES E. CLARK, OF DETROIT, MICHIGAN, ASSIGNORS TO CONTINUOUS TRAIN CONTROL CORPORATION, OF DETROIT, MICHIGAN, A CORPORATION OF MICHIGAN

LOCOMOTIVE CONTROL INSTALLATION

Application filed May 2, 1927. Serial No. 188,115.

This invention relates to the construction of automatic brake-controlling apparatus for locomotives of railways whose trackway is divided into blocks and equipped, in whole or in part, with controlling stations adapted to impress radio-frequency currents of either of two wave lengths upon the rails, according to the occupancy of the track ahead, and to impress both such currents upon the rails at points where the controlled track joins non-controlled track.

This construction is of the same general character as that shown in our pending application Serial Number 125,907, filed July 30, 1926, but embodies additions thereto and modifications thereof which insure the application of the brakes should any material part of the present application fail for any reason.

In the accompanying drawings, Fig. 1 is a diagram of the electric circuits and instrumentalities connected thereto of a locomotive installation embodying the present invention which is responding to "clear" control current along the trackway. Fig. 2 is a diagram of the same constructions responding to "caution" control current. Fig. 3 is a diagram of the same constructions when no current is present along the trackway. Fig. 4 is a diagram of the same constructions responding to both "clear" and "caution" control currents along the trackway. Figs. 5 and 6 are diagrams illustrating still other positions of the instrumentalities.

Similar reference characters refer to like parts throughout the several views.

In the following description, whenever an armature is specified, it will be denoted by a small letter together with the reference numeral of its relay. It will be understood that wherever a number of armatures are shown belonging to a relay, these armatures need not be separate and independent elements but may be parts of the same armature provided with separate and independently acting contacts and conductors, which are well known constructions in this art.

The two receptor coils 1 and 2 and the circuits connected thereto are designed to develop potential by reason of electro-magnetic flux or force at the rails of a controlled track which will usually be divided into blocks provided with instrumentalities at their exit ends to impress radio-frequency currents upon the rails, the frequency of such currents being variable according to the condition of the blocks of track in advance, depending on occupancy, broken rails or open switches, the arrangements and construction of such current transmitting devices being such that current of one frequency will be impressed when the block in advance is occupied and a current of another frequency when the block in advance is unoccupied but no current being present in that portion of an occupied block between the occupying obstacle and the entrance end of such block. In the present construction, the receptor coil 1 and the circuits connected thereto are intended to respond to the train control current which is present in a block when the next block in advance is unoccupied, and will be termed the "clear" circuit, while the coil 2 and its circuits respond to current when the block in advance is occupied and will be termed the "caution" circuit. Receptor electron tubes 3 and 4 and operating tubes 5 and 6 are connected into the circuits of these coils and these operating tubes control the opening and closing of electric circuits and relays connected therein to govern the automatic operation of the air brakes of the locomotive or other vehicle equipped with the present installation.

The receptor coils 1 and 2 are preferably mounted on the leading truck of the locomotive near the rails so as to pass through the energized fields of greatest electro-magnetic flux around the rails, and the filament circuit of the tubes 3 to 6 inclusive includes loops which extend down to and around these receptor coils so that should either be torn from its mounting, the circuit of the tube filaments will be broken. This circuit is over wires 7, 8 and 9, resistance 10, wires 11 and 12, exhaust switch 13, wire 14 armature 15$^a$, wire 16, relay 15, wire 17, loop 18, wire 19, loop 20, wire 21, filament of tube 3, wire 22, filament of tube 5, wire 23, filament of tube 6, wire 24, filament of tube 4, wire 25 and main return wire 26.

The plate current is derived from a dynamotor 27 which is energized by current derived from the generator G over wires 7—28 and 29—25—26. The wire 30 extends from the dynamotor and connects to the primary windings 31 of transformers 32 and 33 and then to the plates of tubes 3 and 4. Wires 34 and 35 extend from the wire 30 to relays 36 and 37 and from these relays, wires 38 and 39 connect to the plates of the tubes 5 and 6. The filaments of the tubes are connected by the wires 22, 23 and 24, and the wire 23 connects to the dynamotor by means of the wires 40 and 41, resistance 42, wires 43 and 44, resistance 45, wire 46, resistance 47 and wire 48.

The two receptor coils connect to adjustable condensers 51 and 52 by means of wires 53, 54, 55 and 56. The wire 53 connects to the grid of the electron tube 3 and the wire 56 to the grid of the tube 4 while the wires 54 and 55 adjustably connect to the resistance 42 which connects to the negative end of the resistance 57 by means of wire 58. As the currents in these receptor coil circuits are usually weak, the electron tubes 5 and 6 are made use of. If the current in these receptor coil circuits were sufficiently strong, the second tubes 5 and 6 might be dispensed with.

In order that all instrumentalities of this installation may move to neutral or "danger" position should any breakage or failure occur, provisions are so made that the control relays 36 and 37 will function only when proper electro-magnetic conditions exist in the track rails and in either or both receptor circuits. Means are therefore provided to normally charge the grid of each electron tube with a sufficient negative potential in relation to the filament to obstruct to some extent the passage of the direct current between the filaments and the plates of the tubes, the negative bias of the grids of tubes 5 and 6 being greater than that on the grids of tubes 3 and 4. This places a low load on tubes 3 and 4 and practically no load on tubes 5 and 6, and also prevents the cores of the transformers 32 and 33 from becoming saturated.

The resistance 57 connects to the positive side of the dynamotor by means of wire 30 and is preferably of about 5000 ohms, much greater than that of resistances 42, 45 and 47 combined. Resistance 57 therefore so influences resistance 42 that this resistance 42 may be considered as an extension of the negative end of resistance 57 in relation to the filaments. The plates of the four tubes also connect to the positive wire 30 as above described, and these plates are therefore positive relative to the filaments of these tubes which connect to the negative wire 48 through the resistances 42, 45 and 47.

A negative bias of potential is impressed upon the grid of tube 3 by reason of the wire 54 engaging the resistance 42 on the negative side of the filament connection 41, the circuit to this grid being over this wire 54, receptor coil 1 and wire 53. Similarly, the circuit to the grid of tube 4 consists of the wire 55 engaging resistance 42, coil 2 and wire 56. An electro-magnetic flux around the track rail is responded to by a receptor circuit and an alternating potential is built up in the receptor circuit which alternates at the frequency to which this receptor circuit is tuned. This alternating potential acts on the grids of tubes 3 and 4 to cause them to be first less negative and then more negative and this action causes the currents in the plate circuits to increase and decrease in unison with the frequency impressed on the grid circuit. So long as constant direct current passes from filament to plate in tubes 3 and 4, no current is induced in the secondary windings 60 and 61, but when the potential is induced in the receptor circuit it changes the bias on the grid of tube 3 or 4; the current passing from filament to plate of such tubes is increased and decreased, resulting in an alternating current being induced in the proper secondary winding.

The current from the dynamotor passes to the plates of the several tubes and to the relays 36 and 37 over the following circuits, whenever the negative bias of each of the tubes is changed as stated. From the wire 30 over wire 34, relay 36, wire 38 to the plate of tube 5, and to the filament of tube 5.

From the wire 30 over wire 35, relay 37, wire 39 to the plate of tube 6 and to the filament of tube 6.

From the wire 30 over primary winding 31 of transformer 32 to the plate of tube 3 and to the filament of tube 3.

From the wire 30 over primary winding 31 of transformer 33 to the plate of tube 4 and to the filament of tube 4.

From the filaments of the several tubes, this plate current passes over the wires 22, 23 and 24 connecting these several filaments to the wire 40 and thence over wire 41, resistance 42, wires 43 and 44, resistance 45, wire 46, resistance 47 and wire 48 back to the dynamotor. As the end of the wire 30 connected to the dynamotor is positive in potential relative to all other portions of these circuits, current cannot flow opposite to the directions indicated at any points in the circuits.

Negative bias is also present in the grids of tubes 5 and 6, this bias of the former being derived from the connection 46 between the resistances 45 and 47, while that of the tube 6 is derived from the connection 43 between resistances 42 and 45. So long as this bias continues constant in tube 5, its plate current is somewhat obstructed, but whenever the current is varied in the plate circuit of tube 3, induced alternating current is set up in the secondary winding 60 of transformer 32, the positive halves thereof reducing the negative bias of the grid of tube 5 so that current may flow in the plate circuit of that tube and energize relay 36. In the same manner, relay 37 responds to oscillating current in the circuit of receptor coil 2.

The usual grid leaks 63 are connected into the grid circuits of tubes 5 and 6, so that, if the secondary windings 60 and 61 burn out, the negative bias of potential referred to above is not affected thereby. Condensers 64 are positioned wherever necessary to by-pass and confine the radio-frequency currents to their proper circuits. A by-pass condenser 65 bridges between the main positive wire 30 and negative wire 48 and a condenser 67 by-passes the resistance 57. Small switches 68 and test jacks 69 may be installed wherever desirable to afford an opportunity for the use of current meters. A wave trap 66 may be connected into each of the receptor coil circuits to eliminate interference from any electro-magnetic waves excepting those for which that particular receptor circuit is tuned.

When receptor coil 1 intercepts electro-magnetic flux of proper frequency, current from the plate of tube 5 energizes relay 36, and when coil 2 intercepts proper flux, relay 37 is energized. When neither receptor coil intercepts flux for which it is tuned, neither of these control relays are energized and their armatures are in dropped position.

Fig. 1 shows the position taken by the instrumentalities when the receptor coil 1 passes over a rail on which electro-magnetic force of "clear" wave length is impressed, to which force the circuit of this coil is tuned. Relay 36 is energized and attracts its several armatures, while relay 37 is de-energized and its armatures are in their dropped positions.

Current passes to the green or "clear" signal lamp 70 from generator G over wires 7 and 8, resistance 71 and wire 72, and from this lamp over wire 73, dropped armature 37$^c$, wire 74, armature 36$^d$ and wire 26. Current also passes over wires 7 and 76 to the electro-pneumatic valve 77, and thence back over wire 78, armature 15$^b$, wire 79, dropped armature 37$^a$, wire 80, attracted armature 36$^a$, wire 82, forestalling key 83 and wire 26 to the generator.

It will be noticed that this circuit for the E. P. valve is kept closed by armature 15$^b$ and that the energizing circuit of relay 15 includes the filaments of all the electron tubes and the loops 18 and 20 so that should any filament be ruptured or either receptor coil be torn from its support, the E. P. valve will be de-energized and the brakes applied.

The E. P. valve 77 is of any well known construction, but we prefer that shown and described in the application filed December 8, 1926, by William L. Coop and Charles B. Stone, which comprises a pneumatic switch, the whole construction being indicated conventionally in the present drawings, it being remembered that if the E. P. valve remains open for a predetermined length of time, say five seconds, before the forestalling key 83 is depressed, switch 13 is opened which switch is included in the normal energization circuit of the E. P. valve, and the circuit between wires 12 and 13 cannot be again closed until the brakes are fully applied and the air pressure reduced as will presently appear. All the circuits of the E. P. valve include armature 15$^b$.

When receptor coil 2 and its circuit respond to current in the rails, that is, when relay 37 is energized and relay 36 is de-energized, the operative positions of the several parts are shown in Fig. 2 of the drawings. Current now flows to the yellow or "caution" lamp 85 over wires 7, 8 and 72, and from the lamp wire 86, armature 37$^d$, wire 87, armature 36$^c$, wires 88 and 89, armature 90$^b$ in raised position for a reason which will presently appear, wire 93, reset key 94, wires 95 and 96, armature 36$^d$ and wire 26 to the generator.

When relay 36 is de-energized and relay 37 is energized, the normal circuit of the E. P. valve is opened by armature 36$^a$ and 37$^a$ and unless another circuit is closed before the circuit to relay 15 is opened by switch 13, the brakes will be applied. This new circuit is closed by relay 90 which is energized when the forestalling key is depressed to close the circuit consisting of wires 7, 8, 9 and 97, relay 90, wire 98, armature 36$^b$, wire 99, depressed key 83 and wire 26. This relay 90 is slow acting so that its holding circuit over armature 90$^a$, wire 101, armature 37$^b$, wire 102, armature 36$^a$, wire 82, released key 83 and wire 26 will be closed by this key before relay 90 drops its armatures.

The new circuit for the E. P. valve is over wires 7 and 76, E. P. valve, wire 78, armature 15$^b$, wires 103 and 104, armature 90$^c$, wire 93, key 94, wires 95 and 96, armature 36$^d$ and wire 26 to the generator. As stated before, should the actuation of the forestalling key be delayed until after switch 13 opens, the application of the brakes cannot be prevented. But if the engineer is alert, he can forestall such application and keep control of his train.

Figure 3:
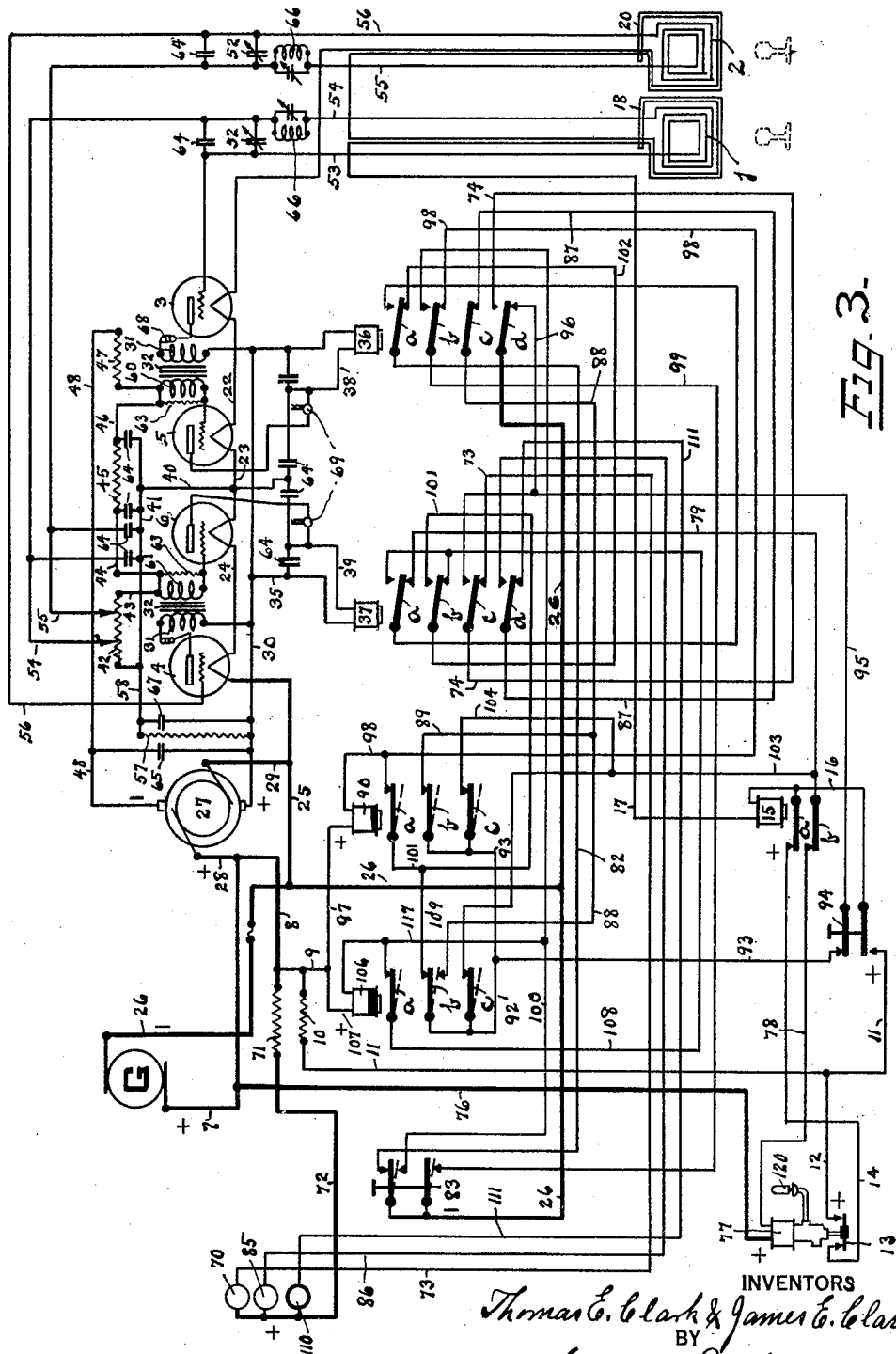
Fig. 3 shows the position of the parts when the locomotive is in controlled territory, but when there is no current to which either receptor coil can respond and both relays 36 and 37 are de-energized.

conditions embodies raised armature 37$^b$. But under the conditions shown in Fig. 3 when relay 37 is de-energized because of "danger" conditions, relay 90 is also de-energized because its holding circuit is opened, and the circuit of the E. P. valve is also opened. If now the engineer depresses the forestalling key 83 before switch 13 opens, the following energizing circuits may be closed by depressing this key. From the generator over wires 7, 8, 9 and 107, relay 106, wires 117 and 100 to depressed key 83 and wire 26, and from wire 9 over wire 97, relay 90, wire 98, dropped armature 36$^b$, wire 99, depressed key 83 and wire 26. These relays being slow acting and holding their armatures while key 83 moves to its upper position, the holding circuit from relay 106 over wire 117, armature 106$^a$, wire 108, dropped armature 37$^b$, wire 102, dropped armature 36$^a$, wire 82 and raised key 83. The holding circuit of relay 90 is over wire 98, armature 90$^a$, wires 101 and 109, armature 106$^b$, wires 92 and 93, key 94, wires 95 and 96 and armature 36$^d$ to wire 26.

The "danger" circuit of the E. P. valve is over wires 7 and 16, E. P. valve, wire 78, armature 15$^b$, wire 103, armature 106$^c$, wires 92 and 93, key 94, wires 95 and 96, dropped armature 36$^d$ and wire 26.

The red lamp 110 receives current over wire 72 which current passes over wire 111, armature 37$^d$, wire 87, armature 36$^e$, wires 88 and 89, armature 90$^b$, wire 93, key 94, wires 95 and 96, armature 36$^d$ and wire 26.

All these circuits to the E. P. valve embody raised armature 15$^b$ so that the valve will be de-energized should anyone of the filaments or the receptor coils be broken.

Figure 1:
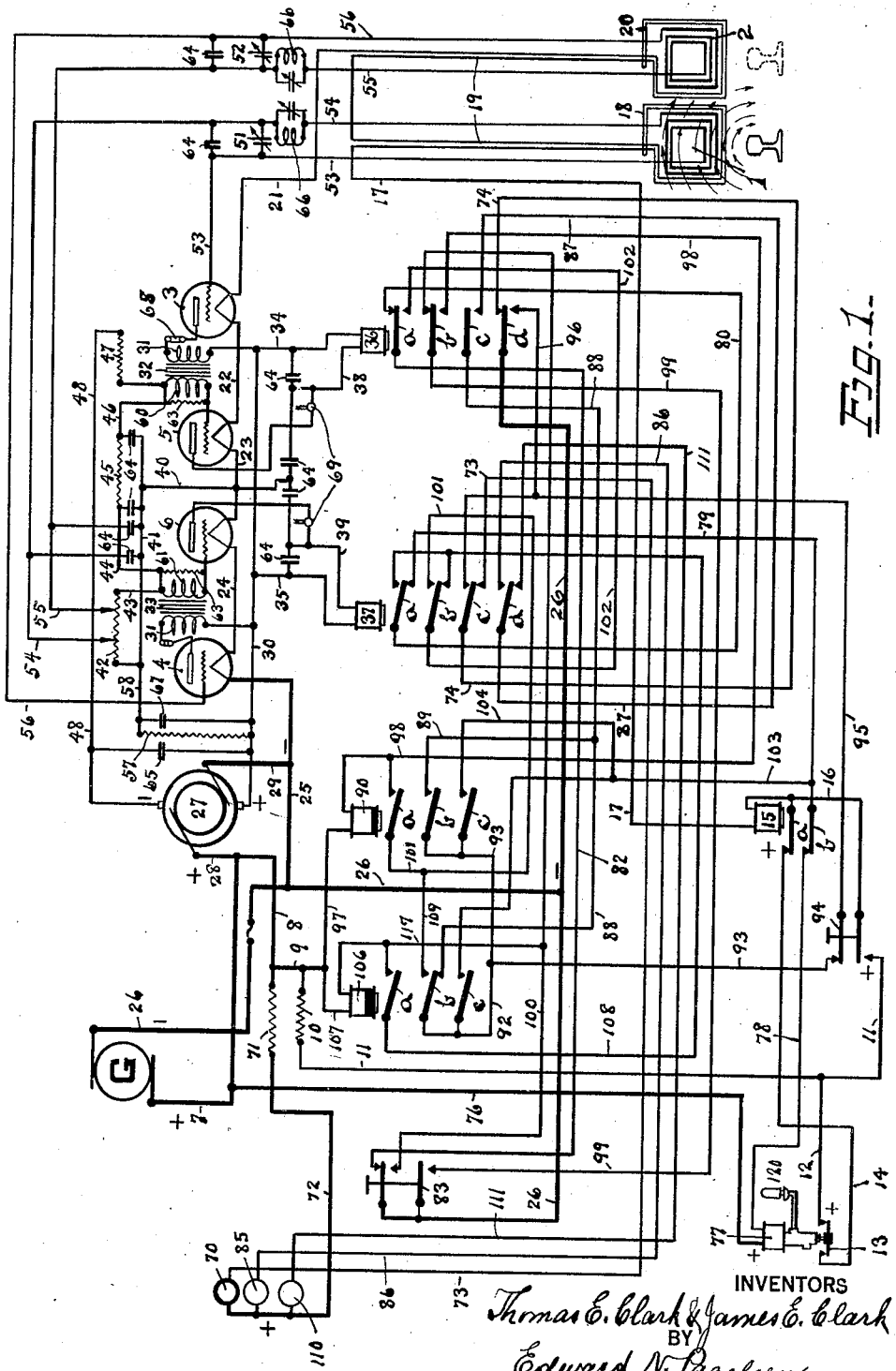
Figure 4:
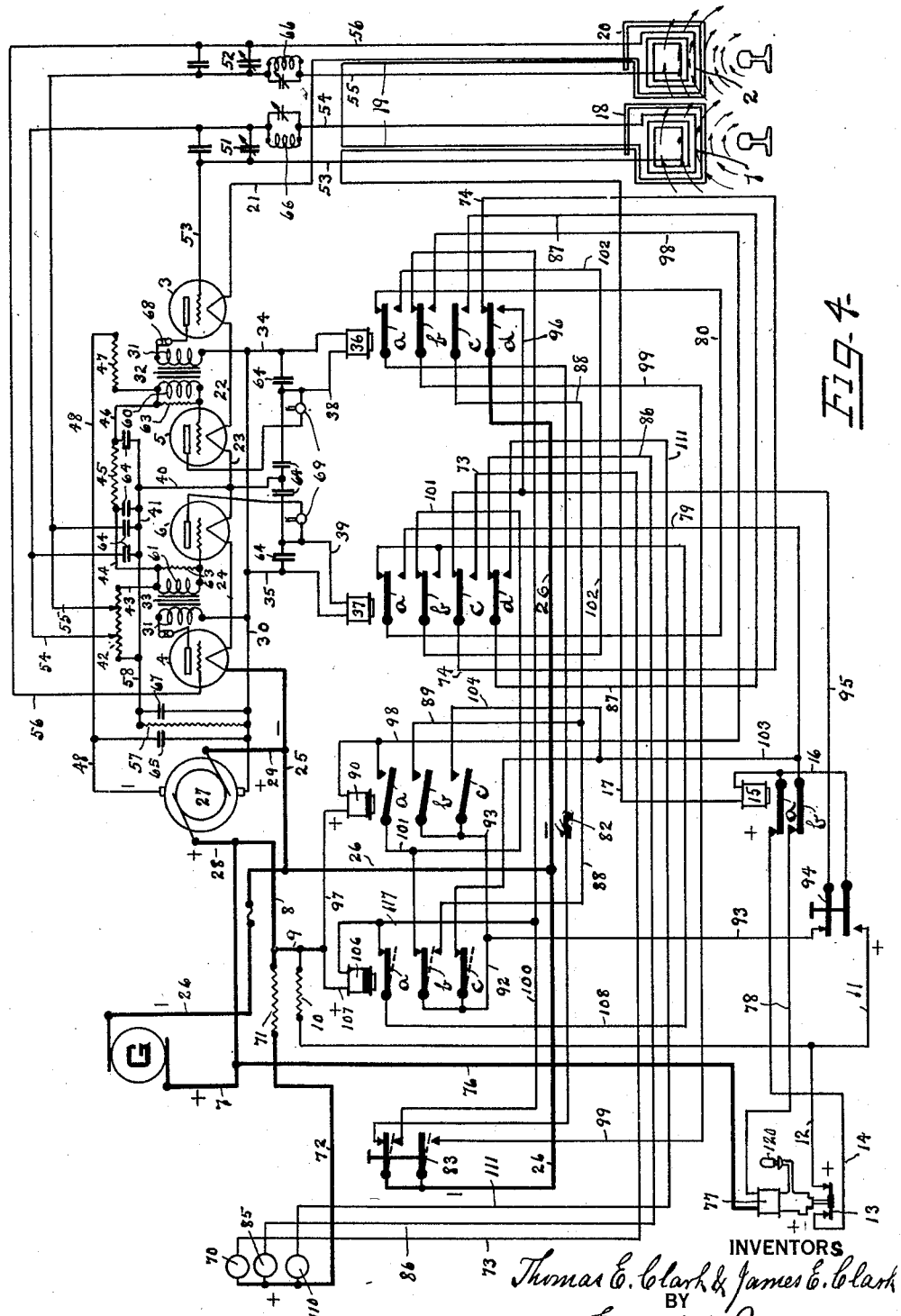

Fig. 4 is a diagram of this installation showing the position of the armatures as the locomotive is passing a proper roadway station at the entrance of non-controlled territory, the roadway station being designed to impress electro-magnetic flux of the two particular wave lengths simultaneously so that both of the receptor circuits and both relays 36 and 37 becomes energized thereby. Such entrance into the trackway thus controlled may be made with the instrumentalities on the locomotive positioned as indicated by either Fig. 1, 2 or 3. In Fig. 1, the energizing circuit of the E. P. valve includes dropped armature 37$^a$; in Fig. 2, the dropped armature 36$^d$; and in Fig. 3 the two circuits for the E. P. valve are closed by energized relays 90 and 106 respectively, but the holding circuit of relay 90 is closed by dropped armature 36$^d$ and the holding circuit of relay 106 by dropped armature 36$^a$. As soon as the two receptor coils begin to function and the relays 36 and 37 become energized, the circuit of the E. P. valve is opened under all conditions of traffic.

If the forestalling key is depressed within the predetermined time, current passes over wires 7, 8, 9 and 107, relay 106, wires 117 and 100 and key 83, and attracted armature 106$^a$ is held sufficiently long to permit key 83 to return to close the holding circuit of this relay over wire 117, armature 106$^a$, wire 108, armature 37$^a$, wire 80, armature 36$^a$, wire 82 and key 83. Relay 106 also closes the new circuit for the E. P. valve over wire 78, armature 15$^b$, wire 103, armature 106$^c$, wires 92 and 93, key 94, wire 95, armature 37$^c$, wire 74, and armature 36$^d$ to wire 26.

As soon as relay 36 is energized, the circuit to lamp 85 is opened by armature 36$^e$, while energized relay 37 attracts its armature $c$ and $d$ and opens the circuits to lamps 70 and 110 respectively. These circuits remain in this conditions until the locomotive leaves the section of track which is provided with electromotive force of two wave lengths and enters entirely non-controlled territory, when relays 36 and 37 become de-energized as indicated in Fig. 5. The dropping of the armatures of relays 36 and 37 closes a new holding circuit for relay 106 constituting of wire 108, armature 37$^b$, wire 102, armature 36$^a$, wire 82 and key 83. The slow acting relay 106 remains energized during the movement of the key 83 to its normal position and the new circuit for the E. P. valve is over wires 7 and 78. E. P. valve 72 wire 78, armature 15$^b$, wire 103, armature 106$^c$, wires 92 and 93, key 94, wires 95 and 96 and armature 36$^d$ to wire 26. None of the lamps receive current and the locomotive may now travel over non-controlled territory as if none of the present automatic train control equipment were present.

Figure 6 illustrates the positions of the parts while the locomotive is running in non-controlled territory. None of the lamps receive current as both relays 36 and 37 are de-energized. Relay 106 receives current as its circuit was held closed by depressed key 83 as the locomotive passes from controlled to non-controlled territory. As it is a slow acting relay, it did not become de-energized when the key 83 was released to establish a stick circuit for this relay over wires 7, 8, 9 and 107, relay 106, armature 106$^a$, wire 108, dropped armature 37$^b$, wire 102, dropped armature 36$^a$, wire 82, key 83 and wire 26.

The circuit for the E. P. valve consists of wires 7 and 76, valve 77, wire 78, armature 15$^b$, wire 103, armature 106$^c$, wires 99 and 93, key 94, wires 95 and 96 armature 36$^d$ and wire 26. This condition continues until current is picked up by either receptor coil.

Should coil 1 pick up current, armature 36$^a$ would open the stick circuit for relay 106 and armature 36$^d$ the circuit for the E. P. valve, but the circuits for lamp 70 and the E. P. valve explained in connection with Fig. 1 would be closed.

Should coil 2 pick up current, the stick circuit for relay 106 shown in Fig. 4 would be opened by armature 37$^b$ and the circuit for the E. P. valve therefore by armature 106$^c$, as shown by Fig. 6. Should the engineer fail to depress his key 83 in time, switch 13 would open the holding circuit to relay 15, as before explained, and the positions of the several parts would be those shown in Fig. 6, which would necessitate the depression of key 94 after the locomotive has come to a full stop.

Figure 2:
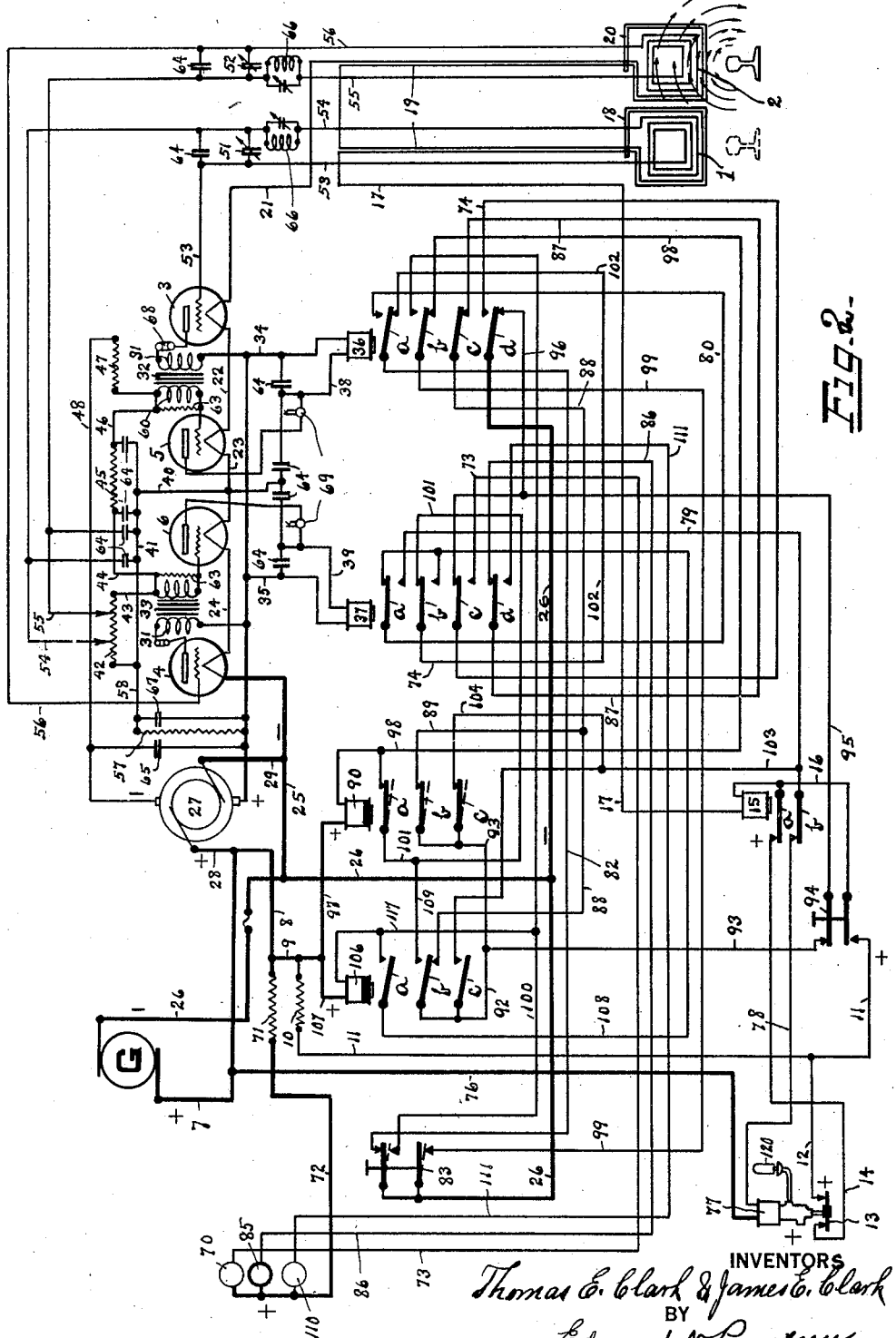
Fig. 2 shows that the "caution" circuit for the E. P. valve is closed by relay 90, and the holding circuit of this relay under "caution"

But should the engineer depress his key in time, the circuit to relay 90 would be closed and the parts will function as explained in connection with Fig. 2.

As stated before, should the engineer fail to depress the forestalling key 83 within the predetermined time after the E. P. valve becomes de-energized and releases train pipe pressure, which is indicated by the small whistle 120 attached thereto, the switch 13 will open the circuit between wires 12 and 13, and this will continue until the train pipe pressure has been exhausted to the predetermined point. Relay 15 also becomes de-energized when its holding circuit over switch 13 is opened. In order to close this holding circuit, the key 94 is depressed and the relay 15 receives current over the wires 7, 8, 9 and 11, key 94, wire 16, relay 15, wires 17, 18, 19, 20 and 21 and through the filaments to wires 25 and 26. As soon as armature 15$^a$ is picked up, the holding circuit for its relay is restored and at the same time, armature 15$^b$ restores the circuit for the E. P. valve shown in Fig. 2. This key 94 is preferably so placed that it is normally inaccessible, so that the locomotive must be brought to a stop before the key can be depressed. This key must also be depressed when a locomotive is to be taken out of the roundhouse in order to energize relay 15 to close the circuit to the E. P. valve, being depressed after the generator and dynamotor have reached their normal speed, the energized E. P. valve permitting the charging of the main air reservoir.

Should either of the receptor coils be broken or any one of the filaments of the tube become inoperative, no plate current will pass to the relays 36—37 and the circuits controlled thereby will normally become inoperative to carry current to the E. P. valve. Failure of the transformers 32 and 33 or of any of the circuits controlled by the relays 36 and 37, or of the generator or dynamotor, will have the same effect.

It will be noticed that the wire 40 extends from wire 23 which connects the filaments of the tubes to the wire 41 and that the breaking of any one of these wires will open all the plate circuits and render relays 36 and 37 inoperative. The circuit between wire 41 and the dynamotor includes the resistances 42, 44, 45 and 47 and the wires 43, 44, 46 and 48, so that should there be a break at any point in this circuit, the plate current of all the tubes will fail.

Vacuum tubes 3 and 4 are biased to that potential which gives the maximum amplification for the style of tube used. This potential is determined by selecting that point on the grid voltage plate current curve of the tube where the tube operates on the straight part of the curve.

In practice the proper potential is found by placing the tubes in their respective circuits and moving the grid return to that point on the testing resistor which gives maximum amplification for the least amount of current flowing in the receptor coil circuit of the tube 3 or 4.

Tubes 5 and 6 are highly negative biased to stop the flow of plate current so that any decrease in the negative potential on this tube will cause current to flow in its plate circuit. This does not necessarily mean that the grid of this tube has been made positive. Current will flow when the negative potential on the grid is decreased and the amount of current that will flow is governed by the style of tube used and the resistance in this plate circuit.

Resistance 57 is connected with resistances 42, 45 and 47 through wire 58 to constitute a resistor which is connected across the high voltage terminals of the dynamotor 24 and the grid bias for the various tubes is obtained by taking taps off from this resistor at points that give the proper potential for the most efficient operation of the tubes.

This combination of resistances is used to obtain both the plate current and the grid bias potentials. The positive feed to the various plate circuits is taken off from wire 30 and the negative plate connection to the filaments is taken off at wire 41 which connects to end of resistance 42. The various grid potentials are obtained by moving the wires 54 and 55 along the resistance 42 toward or from the negative terminal of the dynamotor. It will be seen that the negative return for the plate current is through the resistance 42 over 43, wire 44, resistance 45, wire 46 and resistance 47 to the negative terminal of the dynamotor and should this circuit be broken at any point in the circuit, the negative plate connection will be broken and no current will flow in the plate circuit of the various tubes.

Should the engineer permanently secure the key 83 in its depressed or operative position, the circuit to the E. P. valve would be opened whenever relay 36 is energized, which occurs during normal track conditions. During "caution" or "danger" conditions or when the parts are in the positions shown in Figs. 4, 5 and 6, the locomotive would receive no automatic brake application with the key 83 in its operated position. When the locomotive is running under "danger" conditions, a change to "caution" condition requires no operation of the key 83, but the reverse does require it. In other words, increasing danger must be acknowledged but decreasing danger need not.

The system shown and described may therefore be said to be biased on the side of safety.

The details of construction and the proportions of the parts of this locomotive installation may all be changed by those skilled in the art without departing from the spirit of our invention as set forth in the following claims.

We claim:—

1. In combination with a current source, a pair of electro-magnetic elements, an electron tube for each electro-magnetic element and embodying a plate electrically connected to such element, a filament for each tube connected to said current source and a grid between the plate and filament, a receptor electron tube for each of the first named tubes, means to establish negative bias of potential on the grids of the several tubes, receptor coils adapted to receive oscillating currents, electric circuits connecting said coils to the grids of the receptor tubes, and a circuit between the current source and the filaments of all of said tubes including loops extending around both of said receptor coils.

2. In combination with a current source, a pair of relays and circuits connecting one pole of each to the current source, an amplifying electron tube for each relay embodying a plate connected to the other pole of the relay, a complete resistance circuit embodying resistances in series and connections to the current source, receptor electron tubes and transformers connected to the plate circuits thereof, a connection between the filaments of said tubes and said resistance circuit, the secondary windings of said transformers being connected to the grids of said first named tubes, connections extending from the grids of all said tubes to said resistance circuit on the negative side thereof relative to the filament connection so as to normally produce a negative bias of potential in the grids, and receptor coils and circuits thereto connected to the grids of said receptor tubes.

3. In combination with a current source, a train-control valve adapted to be held closed by current from said source, a circuit between the current source and said valve, a receptor for high-frequency current and instrumentalities controlled thereby for closing said circuit, a second circuit between the current source and said valve, a forestalling key in said circuit, a second receptor for high-frequency current and instrumentalities controlled thereby for closing said second circuit when said key is moved to circuit-closing position, a third circuit between the current source and said valve adapted to be closed by said key and the simultaneous action of the instrumentalities controlled by both of said receptors, and an electro-magnetic switch controlled by said valve for opening the energizing circuit of said valve should predetermined time elapse between the opening of said valve and the closing of said key.

4. In combination with a current source, a pair of control relays and the armatures thereof, a current source, a train-control valve normally held closed by current from said source, a forestalling key and circuits between the current source and said valve whereby current will flow to said valve when one of said relays is energized, and when the key is actuated and the second relay is energized, a third relay and circuits between its armatures and said valve, key and current source which circuits are closed when both the first named relays are deenergized and the key is actuated, an electro-pneumatic switch controlled by said valve for opening the energizing circuit of said valve should predetermined time elapse between the opening of said valve and the closing of said key, and a fourth relay and circuits between its armatures and said valve, key and current source between which circuits are closed when both the first named relays are energized and the key is actuated.

5. In a train control system, a vehicle, train control means thereon comprising two relays, receptor means adapted to cause the energization of both of said relays simultaneously in response to two distinctive controlling influences received simultaneously from the trackway, traffic signals on the vehicle, means for controlling the cab signal indications according to said influences, a warning whistle and control devices therefor to cause the whistle to signal when both of said relays are energized simultaneously, and means positioned upon the simultaneous energization of said relays for preventing the operation of said train control means when said relays are subsequently simultaneously de-energized.

6. In a train control system for railways having portions of their trackway equipped and portions not so equipped with trackway means for transmitting two distinctive control influences to a moving vehicle under favorable and unfavorable traffic conditions respectively and for transmitting both of said distinctive control influences at the point where the equipped trackway ends and the unequipped trackway begins, car carried apparatus responsive to such influences for causing the operation of a train control device when no such influences are transmitted, and additional car carried means responsive to the simultaneous transmission of said distinctive influences for preventing the operation of said train control device while the vehicle is traveling in said unequipped portions of trackway.

7. In an automatic train control system for railways having portions only of the trackway equipped with installations for transmitting either one of two distinctive controlling influences to a moving vehicle under favorable and unfavorable traffic conditions respectively and for transmitting both of said influences at the point where the equipped trackway ends and the non-equipped trackway begins, car carried apparatus selectively responsive to such influences and cab signals controlled thereby to indicate favorable and unfavorable traffic conditions respectively, said car carried apparatus selecting the cab signal corresponding to unfavorable traffic conditions when no influences are received from the trackway, and additional car carried means, responsive to the simultaneous transmission of said influences, for preventing the operation of said cab signal indicating unfavorable traffic conditions while the vehicle is traveling in said unequipped portions of trackway and no influences are being received.

8. In an automatic train control system for railways having portions only of the trackway equipped with installations for transmitting either one of two controlling influences of distinctive frequency to a moving vehicle under "clear" and "caution" traffic conditions respectively, such influences not being omitted under "danger" traffic conditions, and for simultaneously transmitting both of such controlling influences at the point where the controlled trackway ends and the non-controlled trackway begins, car carried apparatus selectively responsive to such influences comprising cab signals indicating "clear", "caution" and "danger" traffic conditions respectively, an additional car carried means responsive to the simultaneous transmission of said influences for preventing the actuation of said cab signals indicating unfavorable traffic conditions while the vehicle is travelling in said unequipped portions of trackway and while no influences are being received.

9. In combination with a current source, a plurality of electro-magnetic elements, an electron tube for each of said elements, a receptor electron tube for each of the first named tubes, the plate of each receptor tube being connected to the grid of a first named tube, receptor coils adapted to receive oscillating currents, electric circuits connecting said coils to the grids of the receptor tubes, and a circuit between the current source and the filaments of all of said tubes including loops extending around both of said receptor coils.

10. In combination with a current source, a plurality of electro-magnetic elements, an electron tube for each of said elements, a receptor electron tube for each of the first named tubes, the plate of each receptor tube being connected to the grid of a first named tube, means for biasing the potential on the grids of the several tubes, receptor coils adapted to receive oscillating currents, electric circuits connecting said coils to the grids of the receptor tubes, and a circuit between the current source and the filaments of all of said tubes including loops extending around both of said receptor coils.

THOMAS E. CLARK.
JAMES E. CLARK.